INVENTORS.
CHARLES J. WAECHTER &
LLOYD KOVACS
BY
Thomas S. Mayner
ATTORNEY

INVENTORS.
CHARLES J. WAECHTER &
LLOYD KOVACS
BY
Thomas S. Mayner
ATTORNEY

United States Patent Office 3,444,604
Patented May 20, 1969

3,444,604
APPARATUS FOR TRIMMING AND REMOVING
NECK FLASH FROM BLOWN ARTICLES
Charles J. Waechter, Piscataway, and Lloyd Kovacs,
Somerset, N.J., assignors to Midland-Ross Corporation,
Cleveland, Ohio, a corporation of Ohio
Filed Feb. 1, 1967, Ser. No. 613,237
Int. Cl. B23p 25/00
U.S. Cl. 29—33                                    4 Claims

ABSTRACT OF THE DISCLOSURE

A plurality of bottles needing their necks trimmed are generally continuously fed into a circulating carrier, having buckets conforming in shape, over a neck trimming station then to a forwarding station for removal to either storage or for immediate filling.

---

This invention relates to a neck trimming apparatus of blown plastic bottles or jugs and, more particularly, to one being adapted to be positioned in a continuously manufacturing bottle blow molding line conveying one or more bottles or jugs at a time for trimming and, then, forwarding the finished hollow article to either a filling station or to storage.

In the manufacture of blow molded plastic bottles or jugs, the neck trimming operation often is delayed to permit the narrowed but more concentrated neck area to cool and harden and reach its final size so that it can be handled without deformation. When molded the neck portion usually is blown with additional material to prevent it from collapsing. Where the tab extending from a bottle's base can be removed almost nearly at once, the neck section must be more carefully handled. Especially in a continuous production layout featuring a plural cavity mold or several individual molds, detabbing is usually immediately performed but neck trimming is done quite a bit later after sufficient cooling. The two operations are, thus, spaced in time resulting in an extended production line. This extended condition permits, however, more proper handling of the bottles or jugs to better present them for a neck trimming and does not consume important and costly manufacturing time since the blow-molded bottles or jugs advantageously can be transported overhead.

The neck trimming apparatus of this invention advantageously accepts from one to four or more jugs at a time from individual or a plurality of extruders, and it is adapted to continuously operate irrespective of feed, with the trimmed jugs then ejected or forwarded either to a filling station or to storage. The neck trimming apparatus herein mentioned is described in detail in connection with the accompanying drawings, wherein.

Figure 1:
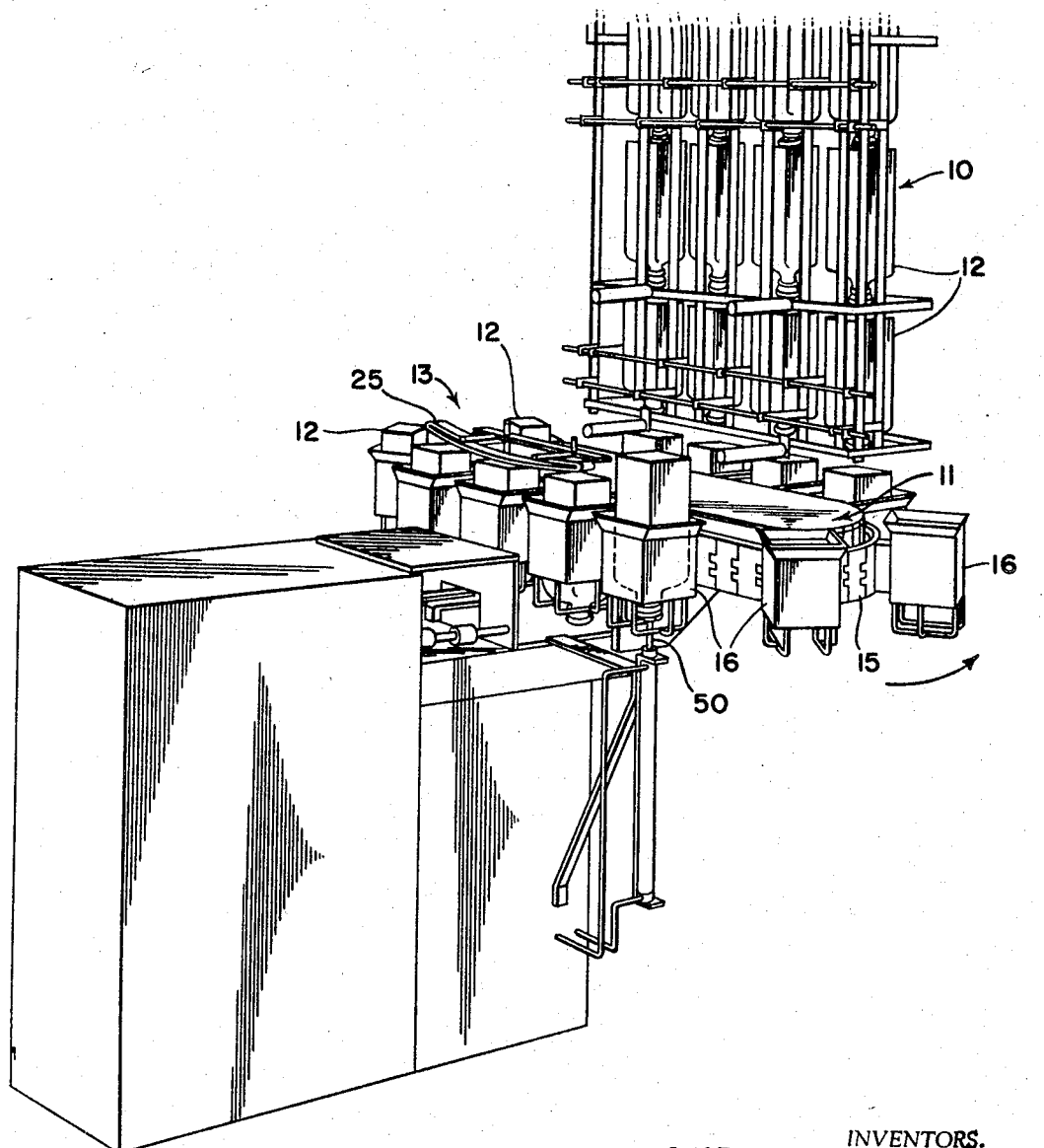
FIGURE 1 is a perspective general view of the trimmer apparatus and its feed of jugs to be trimmed.

The neck trimmer of this invention, although it can be hand fed, is advantageous in a continuous manufacturing line where a continuing supply 10 of jugs 12 in an inverted position is provided from various sources. The neck trimming apparatus 13 generally shown in FIGURE 1 and in greater detail in FIGURES 2 and 3 comprises a table support 11 mounting an endless belt 15 to which are secured a plurality of rectangular buckets 16 by either welding or bolting and which belt is in halting continuous rotation; the momentary stops for the belt 15 being for deflashing and reaming, the operations being performed in but a few seconds. An acceptance of the jugs occurs at every fourth stop thus allowing four jugs at a time to enter the buckets. Specifically, the belt 15 rotates counter-clockwise about end cog wheels 19, 19a at the ends and guiding channels 14 in between. The empty buckets 16 bolted to the belt 15 accept dropping jugs 12 during the interval required for stopping of the belt to permit the neck trimming operation. Upon stopping the buckets 16 are filled by an automatic releasing of the waiting jug supply 10 through switch 17 cooperating with cam 52 secured to a bucket back. The switch 17 is stationarily mounted on the table 11. The cam 52 is positioned, in this example, on every fourth bucket equaling the number being supplied. During the loading and trimming period belt 15 motion is positively held back while four jugs at a time are released. While the buckets 16 are being refilled the trimming of advanced units is continuing.

Figure 2:
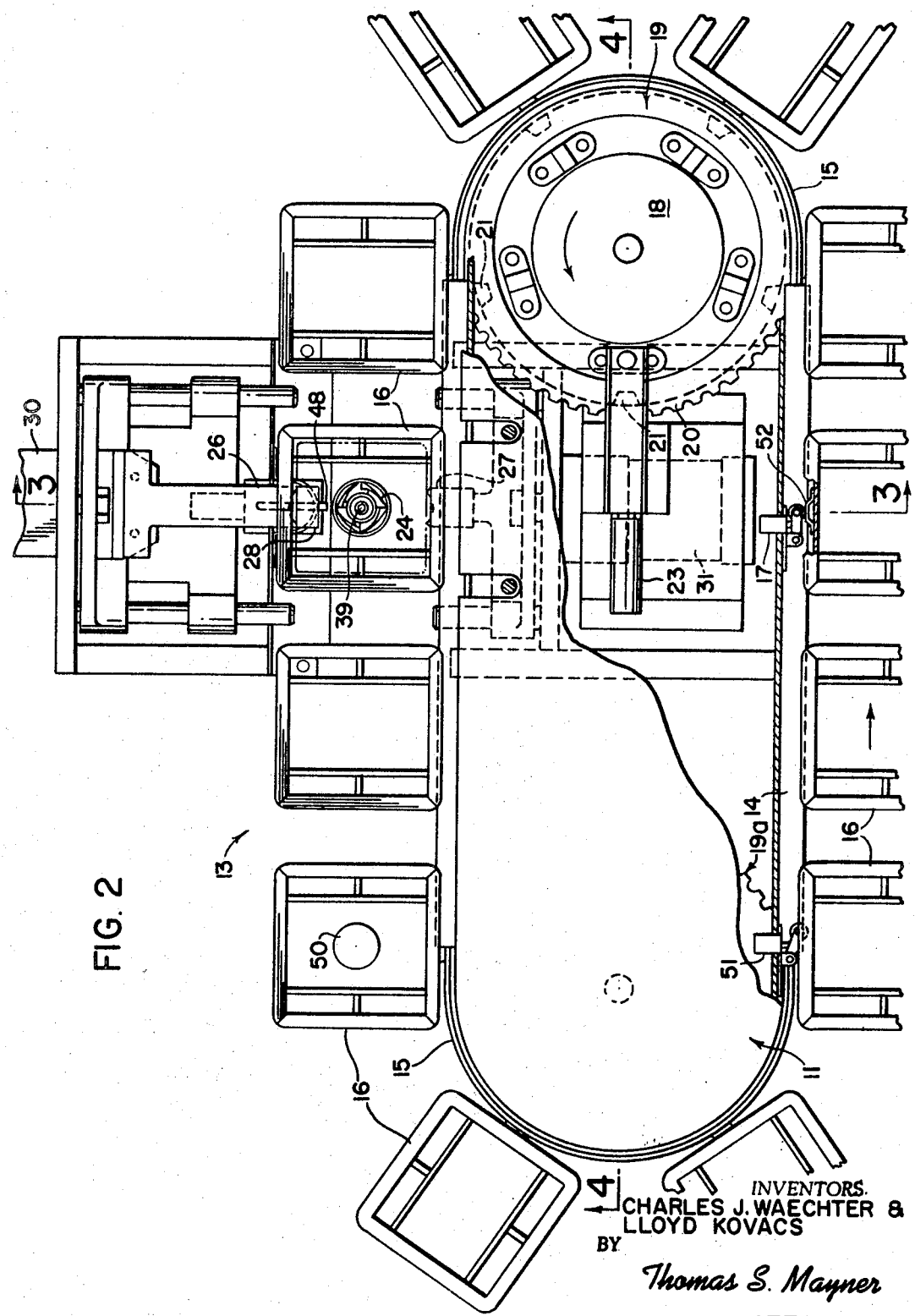
FIGURE 2 is a plan view of the operational feed, trimming means, the endless belt to which receiving buckets holding jugs are fastened and jug eject means.
Figure 3:
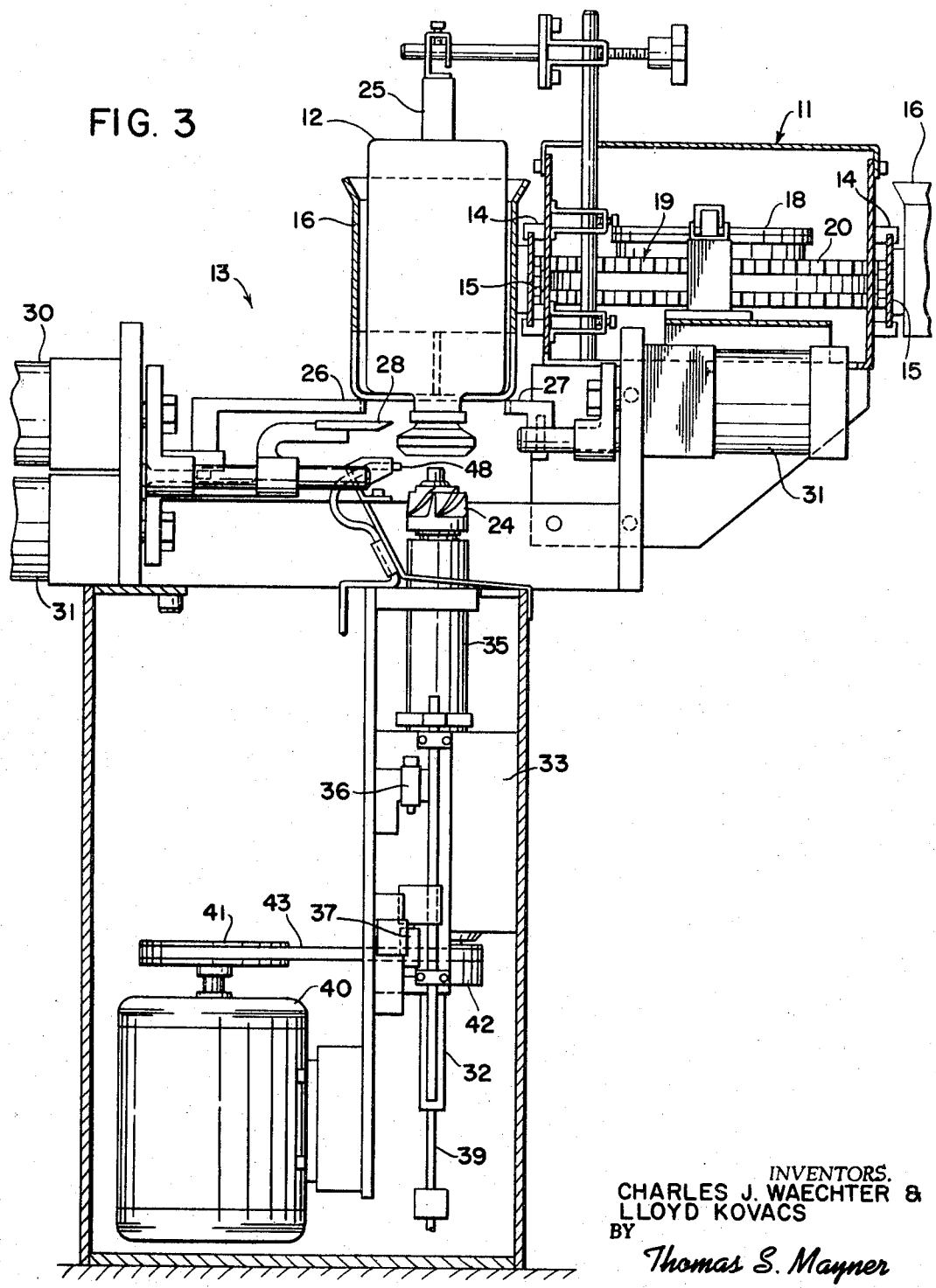
FIGURE 3 is a sectional elevation of FIGURE 2 across lines 3—3 showing the trimming means.
Figure 4:
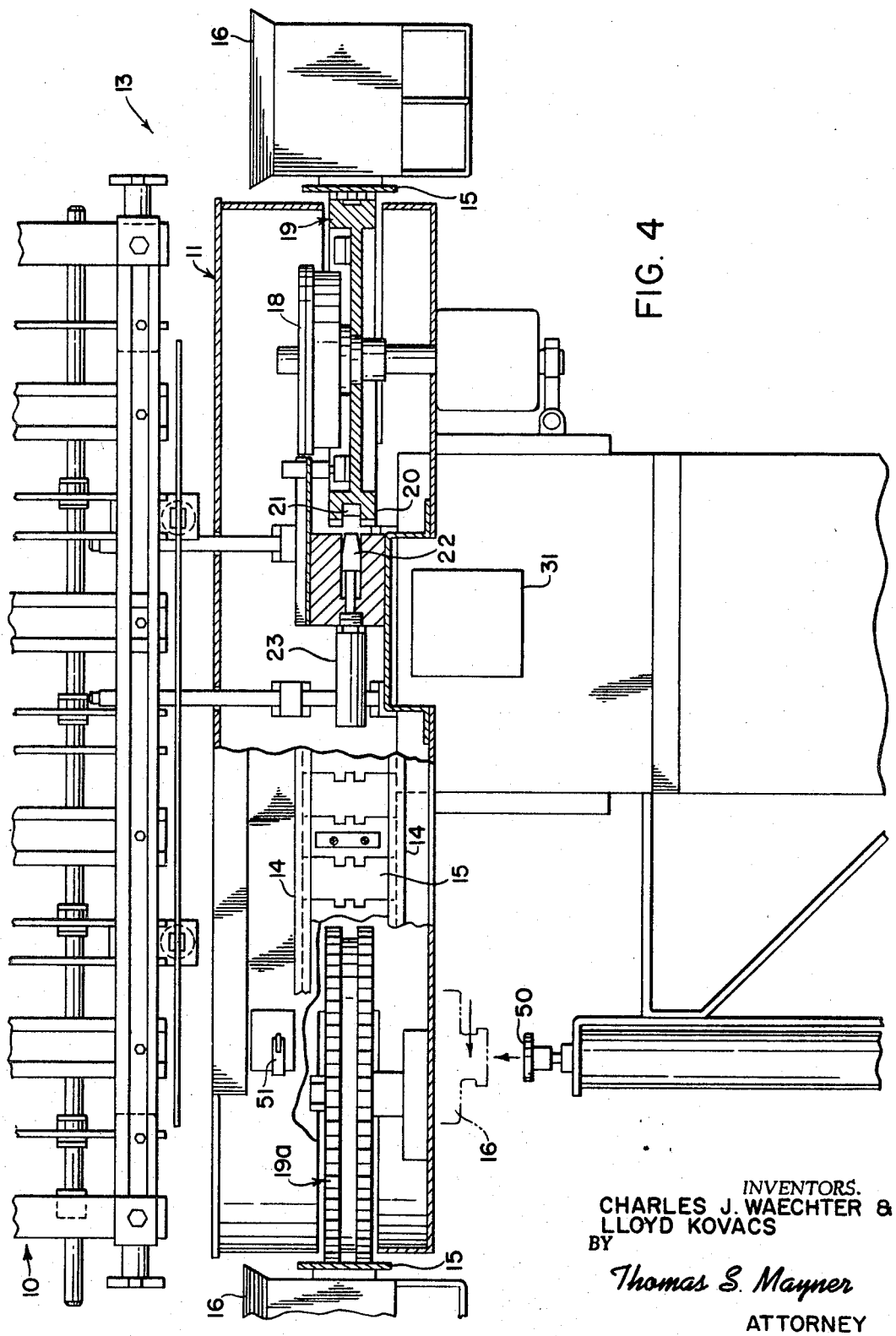
FIGURE 4 is a split sectional view of the endless belt, driving means, bottle ejection of FIGURE 2 taken along lines 4—4.
Figure 5:
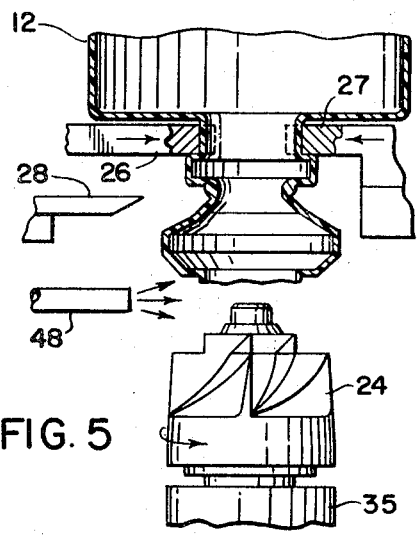
FIGURES 5-8 show the reamer relative to an unfinished jug neck and to one that is finished.
Figure 6:
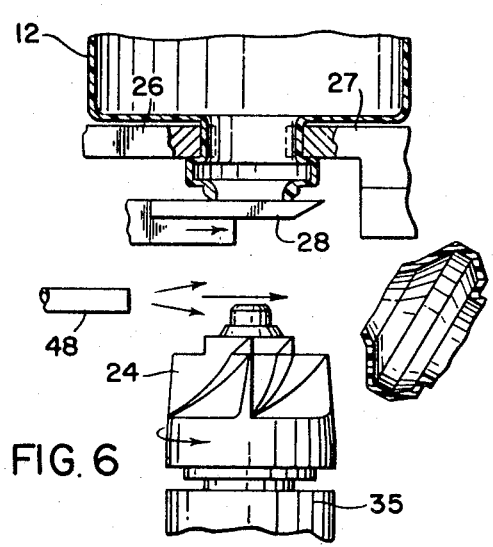
Figure 7:
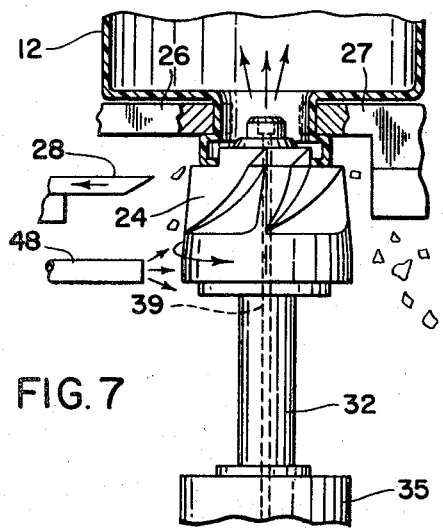
Figure 8:
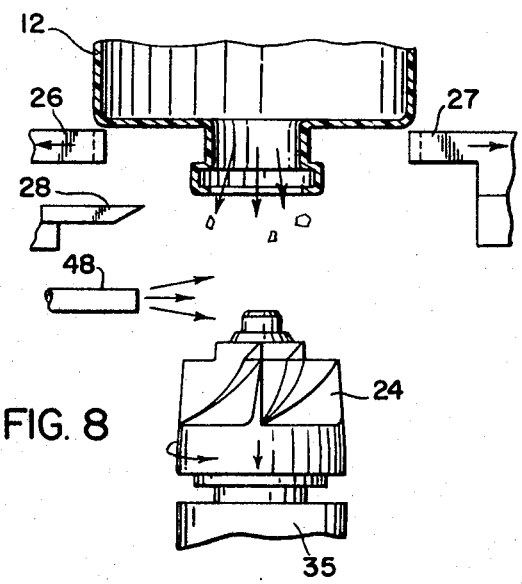

The stop and go operation of the bucket 16 advancing belt 15 is effected by means of a combined clutch and gear unit with the clutch 18 being raised off the horizontal gear 19 which supports and drives the belt 15. This is shown in FIGURES 2, 3 and 4. A similar belt driving gear is gear 19a, except for the clutch, it is freely mounted for rotation at the other extreme providing necessary far end support. Also, to the clutch gear 19 there is attached a ring 20 having spaced indentations 21 adapted to receive the pin 22. The pin 22 is placed into and is withdrawn by the air cylinder 23 from the indent 21 at the moment the clutch is released from or attached to drive the gear 19 effecting a forward movement of the belt and of the buckets 16. Such a stop-start combination is not new and does not form a specific part of this invention since it is available on the market for incorporation into developed apparatus.

The buckets 16 with their charge are led to and stopped directly over a rotating reamer and neck trimmer 24. In their entry to the trimming and reaming zone the jugs 12 must pass under a depressing means 25, a convex flexible metallic member, to firmly hold them against vertical displacement as the neck reamer 24 is forced upwardly into throat contact with each jug. Besides the depresser 25 the neck is grasped and held firmly between opposing arcuate neck clamps 26, 27 while the cutting reamer 24 moves into the neck interior. Whatever the additional material initially added to the neck for reinforcement is first cut off by a slicing blade 28 mounted on the same support carrying the neck clamp 26. The cutting, clamping means are pneumatically actuated through air charged cylinders 30, 31 to which they are secured. The reamer 24 itself is electrically operated being mounted on a sliding shaft 32 rotating in a bearing housing 33 through which it is raised and lowered pneumatically by means of lift cylinder 35. Adjustable switches 36, 37 are interlocked and provide for upward and downward travel control of the lift and of the reamer. Air is injected into the interior of the jugs 12 while they are being trimmed to advantageously, through the tube 39, keep the interior clean of loose matter. The trimmer element 24 is continually rotated by the motor 40 through sheaves 41, 42 and the driving belt 43. Also, the cut neck portion is removed by being blown away by the nearby jet 48 upon cutting by the blade 28, dropping into a scrap chute 45.

All scrap material is saved for later reuse. The trimmed neck portions are blown away by an associated jet 48 from the cutting and trimming area into the chute 45 which can be joined through a connecting conveyor means (not shown) to storage or to regrinding.

Further, in reference to FIGURES 5-8, the knife 28 cuts the excess of the jug neck at a desired level, the cut portion, as stated, being blown away falling in the chute 45. Immediately, the rotating reamer 24 rises into the jug neck finishing it as predetermined. The reamer then returns to its lower position and the belt 15 moves forward carrying another jug to its eject position over the pneumatically operated lifter 50 as shown in FIGURE 1. While over the ejector or lifter 50 a sensor 51 is actuated by a cam 52 on the bucket side activating the pneumatic ejector 50. The ejector 50 preferably operates whether a jug is in a bucket 16 or not. A further conveyer may easily be adapted to cooperate with the ejector position carrying the jugs to a filling station or to storage.

Jugs forwarded from several molds can be accepted by the trimmer, each group waiting its turn to be loaded into the conveyer buckets of the neck trimmer and flash remover. The receiving belt with its buckets can be enlarged to accept any number of the aforementioned streams. Each can be simultaneously loaded as soon as sufficient consecutive empty buckets are presented. The single trimming and deflashing station thus is a flexible unit being adapted to service a plurality of separate multiple head molds, or it can service a plurality of individual single molds comprising the supply 10 so long as there are sufficient waiting buckets, the cycling of the trimmer-flash remover being correlated to the number being loaded singly or simultaneously.

What is claimed is:

1. In combination, an apparatus for trimming necks of blown jugs comprising, a conveyer, jug receiving buckets secured to said conveyer, said jugs being placed in said buckets, means for advancing said conveyer, a one stop one position neck trimming means associated with said conveyer, said neck trimming means including sequentially operable flash removal means and reaming means, said conveyer passing said buckets with said jugs to said neck trimming means, jug seizing means cooperating with said neck trimming means holding said jug in position during trimming, means for stopping said conveyer advancing means when said jugs are being trimmed, jug removing means associated with said conveyer and said buckets, and said removing means adapted to eject neck trimmed jugs from the said buckets during the said neck trimming stoppage.

2. In combination, an apparatus for trimming necks of blown jugs comprising, an endless conveyer, jug receiving buckets secured to said conveyer, said jugs from said supply being placed in said buckets, drive means for rotating said conveyer, a one stop one position neck trimming means associated with said conveyer, said neck trimming means including sequentially operable flash removal means and reaming means, means for depressing said jugs against movement during trimming, said conveyer passing said buckets with said jugs under said depressing means to said neck trimming means, means for stopping said conveyer advancing means when said jugs are being trimmed, means for seizing and holding the neck section to be trimmed, knife means cooperating with said neck seizing means cutting off neck surplus, an associated gas ejector for said neck surplus, inner and outer neck trimming means operable after said cutting of said neck surplus, jug removing means associated with said conveyer and said buckets, and said removing means adapted to eject neck trimmed jugs from the said buckets during the said neck trimming stoppage.

3. In combination, an apparatus for trimming necks of blown jugs comprising, an endless conveyer, jug receiving buckets secured to said conveyer, said jugs from said supply being placed in said buckets, drive means for advancing said conveyer, a one stop one position neck trimming means associated with said conveyer, said neck trimming means including sequentially operable flash removal means and reaming means, said conveyer passing said buckets with said jugs to said neck trimming means, a clutch joining said drive means to said conveyer, means for declutching said drive means and stopping said conveyer advancing means when said jugs are being trimmed, jug removing means associated with said conveyer and said buckets, and said removing means adapted to eject neck trimmed jugs from the said buckets during the said neck trimming stoppage.

4. In combination, an apparatus for trimming necks of blown jugs comprising, an endless conveyer, jug receiving buckets secured to said conveyer, said jugs from said supply being placed in said buckets, drive means for advancing said conveyer, a one stop one position neck trimming means associated with said conveyer, said neck trimming means including sequentially operable flash removal means and reaming means, said conveyer passing said buckets with said jugs to said neck trimming means, a clutch joining said drive means to said conveyer, means actuated by a passing bucket for operating said clutch for stopping said conveyer drive means when said jugs are being trimmed, jug removing means associated with said conveyer and said buckets, said removing means adapted to eject neck trimmed jugs from the said buckets during the said neck trimming stoppage, and means attached to said conveyer operating releasing means of an additional supply into said buckets replacing those ejected.

References Cited

UNITED STATES PATENTS

| | | | |
|---|---|---|---|
| 3,228,086 | 1/1966 | Brown | 29—33.12 |
| 3,230,602 | 1/1966 | Bozek | 29—33.12 |

RICHARD H. EANES, JR., *Primary Examiner.*